United States Patent Office 3,496,158
Patented Feb. 17, 1970

3,496,158
OLEFIN POLYMERIZATION SYSTEM EMPLOYING THREE-COMPONENT CATALYST CONTAINING METAL HALIDE, ORGANO METALLIC HALIDE, AND SUBSTITUTED AROMATIC ALDEHYDE
Charles Donald Fisher, Princeton, and William Russell Watt, Princeton Junction, N.J., assignors to American Can Company, New York, N.Y., a corporation of New Jersey
No Drawing. Filed Apr. 14, 1967, Ser. No. 630,831
Int. Cl. C08f 1/56; B01j 11/84
U.S. Cl. 260—94.9
26 Claims

ABSTRACT OF THE DISCLOSURE

Olefin monomers of 2–10 carbon atoms, either singly or in admixture, are polymerized to solid, highly crystalline polymers in the presence of a catalyst system consisting of a monoalkylaluminum dihalide, a compound of a metal of Group IV–B, V–B or VI–B of the periodic system of elements (as shown in Lange's Handbook of Chemistry, pages 56 and 57, Tenth Edition, 1961), and a substituted aromatic aldehyde such as mesitaldehyde.

BACKGROUND OF THE INVENTION

It is desired to prepare high-molecular-weight solid polyolefins, such as polypropylene, having a high degree of crystallinity. Such polymers exhibit desirable physical properties such as stiffness, high tensile strength, thermal stability, high softening point, and good molding and fiber-forming properties. They are also highly insoluble in aliphatic hydrocarbons. The solubility of the polymer in aliphatic hydrocarbon solvent is a good index of the other properties; the more insoluble the polymer in an aliphatic hydrocarbon solvent, the better its properties. An improvement in the properties of olefin polymers has been achieved by the use of certain catalyst combinations. In the past, the combination of a compound of a Group IV–B to VI–B transition metal, such as titanium trichloride, with aluminum trialkyls or dialkylaluminum monohalides has been used. These mixtures are referred to as Ziegler-type catalysts. However, monoalkylaluminum dihalides in combination with transition metal compounds have not been used successfully to produce stereospecific polymerization of alpha-olefins. The resulting polymers are not crystalline. According to U.S. Patent 3,230,208, a mixture of ethylaluminum dihalide and titanium trihalide is ineffective as a polymerization catalyst for polymerizing propylene.

However, certain compounds have been added to the combination of titanium trichloride and monoethylaluminum dichloride to produce crystalline polymers. These compounds include aliphatic or aromatic amines and amides, ethers, ketones, esters, and acetals. Compounds containing phosphorus, sulphur, antimony, and arsenic have also been used in combination with the titanium trichloride and monoethylaluminum dichloride.

The polymerization of alpha-olefins using the above catalysts results in varying amounts of non-stereoregular or atactic polymers. In the case of polypropylene prepared using a titanium trichloride-triethylaluminum catalyst, as much as 20 percent of the product may be atactic polymer. The presence of a large amount of atactic ploymer has an undesirable effect on the mechanical properties of the end product. The atactic polymer is amorphous and relatively soluble in hydrocarbon solvents.

It is, therefore, an object of the present invention to provide improved processes whereby alpha-monoolefins and particularly propylene can be readily polymerized by catalytic means to give high-molecular-weight crystalline polymers.

Another object is to provide a catalyst combination for the polymerization of alpha-olefins to form crystalline polymers.

Numerous other objects and advantages of the invention will be apparent as it is better understood from the following description which discloses a preferred embodiment thereof.

DESCRIPTION OF THE PREFERRED EMBODIMENTS

It has now been found that the addition of substituted aromatic aldehydes to the transition metal compound-monoalkylaluminum dihalide catalyst system will produce stereoregular polymers of high-molecular weight and crystalline structure. Very little of the amorphous, hydrocarbon-soluble polymer is produced. The substituted aromatic aldehyde which may be used as a catalyst promoter to produce the stereoregular polymers has the following structure:

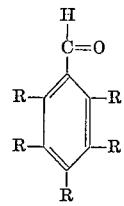

where at least one R is an alkyl group such as methyl, ethyl, propyl, etc., and each of the remaining R's is either hydrogen, or an alkyl or an aryl group. Aldehydes having three or more alkyl substituents are preferred. Aldehydes which may be used include mesitaldehyde (2,4,6-trimethylbenzaldehyde), tolualdehyde, pentamethylbenzaldehyde, triethylbenzaldehyde, triisopropylbenzaldehyde, and tetramethylbenzaldehyde.

The behavior of these aldehydes is unexpected, since it would be predicted that the aldehydes might undergo reaction with aluminum alkyls so as to destroy their catalytic activity. The aluminum alkyls are good reducing agents for carbonyl groups (G. E. Coates, "Organometallic Compounds," page 135, Methuen & Co., Ltd., London, 1960). The aluminum alkyls will reduce chloral, benzaldehyde, cinnamaldehyde and other compounds. However, the substituted aromatic aldehydes have a high-promoting effect on the catalyst system.

The monoalkylaluminum dihalides in combination with transition metal compounds are unable to catalyze stereospecific polymerization of alpha-olefins. The product is usually an oligomer which is not crystalline because of its irregular structure.

The preferred molar ratio of aluminum compound to aldehyde can be varied within the range 1.2:1 to 1.5:1, but it will be understood that higher and lower molar ratios are within the scope of this invention.

The substituted aromatic aldehydes may be used in combination with a mono-substituted aluminum dihalide wherein the aluminum is substituted by a hydrocarbon radical which may be alkyl, aryl, or aralkyl and the halide is selected from the group consisting of chlorine, bromine and iodine and a compound of a transition metal selected from the group consisting of titanium, zirconium, vanadium, chromium and molybdenum which may be a halide, alkoxide, alkoxyhalide or acetylacetonate. The preferred transition metal compound is titanium trichloride or aluminum-reduced titanium trichloride. The substituted aluminum compound is preferably a monoalkylaluminum dihalide, with the preferred compound being monoethylaluminum dichloride.

The polymerization is carried out in the presence of an organic liquid, preferably an inert liquid hydrocarbon, but it may proceed in the absence of a diluent. The polymerization may proceed in the presence of alkanes, cycloalkanes, hydrogenated aromatic compounds, high-molecular-weight liquid paraffins, aromatic hydrocarbons, or halogenated aromatic compounds. The solvent should be liquid under the conditions of reaction and inert to the reactants. Examples of liquid hydrocarbon solvents which may be used are pentane, hexane, heptane, cyclohexane, benzene, toluene, xylene, ethylbenzene, isopropylbenzene, ethyltoluene, n-propylbenzene, diethylbenzene, chlorobenzene, chloronaphthalene, orthodichlorobenzene, isooctane, methyl cyclohexane, tetralin, and decalin.

In order to illustrate more clearly the manner of carrying out the present invention and the nature of the products thereof, the following examples are presented:

Example I

Propylene was polymerized under the following conditions:

The catalyst comprised 3.2 millimoles of $(TiCl_3)_3 \cdot AlCl_3$, 6.5 millimoles of ethylaluminum dichloride and 4.9 millimoles of mesitaldehyde. The vehicle was 100 milliliters of anhydrous benzene. Pressure was maintained at 40 p.s.i.g. of propylene at 70° C. for 24 hours. The reaction was stirred continuously during this time. The polymer formed was kept in suspension by stirring. After quenching with 10 milliliters of methanol, the mixture was poured into 300 milliliters of isopropanol and the polymer was recovered by filtration. The polymer was washed twice with methanol in a Waring Blendor and dried under vacuum at 60° C. The polymer produced weighed 24 grams and was 90.3% insoluble in acetone, 90.2% insoluble in diethylether, 89.6% insoluble in pentane and 87.9% insoluble in heptane. The heptane insoluble polymer had a melting point by differential thermal analysis of 157° C. and an inherent viscosity in tetralin at 135° C. of 2.77 dl./gm.

Example II

The effect of varying the amount of mesitaldehyde included in the catalyst combination was determined.

3.2 millimoles of $(TiCl_3)_3 \cdot AlCl_3$, 6.5 millimoles of ethylaluminum dichloride and 100 milliliters of anhydrous benzene were pressurized to 40 p.s.i.g. with propylene and then vented to atmospheric pressure. Mesitaldehyde was added in differing amounts while the amounts of the other two components of the catalyst were maintained constant. The mixture was stirred at 70° C. for six hours at 40 p.s.i.g. of propylene and the polymer recovered as in Example I.

The following table shows the amounts of polymer produced in relation to the amount of mesitaldehyde added to the mixture.

| Millimoles Mesitaldehyde Added | Grams Polymer Produced | Percent Heptane Insoluble |
| --- | --- | --- |
| 3.06 | 0.6 | |
| 4.28 | 3.5 | |
| 4.48 | 5.7 | 78.6 |
| 4.69 | 5.7 | 79.0 |
| 4.90 | 16.2 | 90.6 |
| 5.32 | 15.6 | 92.2 |
| 5.52 | 2.6 | 82.6 |
| 5.72 | 0.6 | |
| 5.93 | 0.4 | |
| 7.14 | 0.2 | |

The largest amount of polymer produced was at the molar ratio of Al/Ti/mesitaldehyde of 2/1/1.55 and 2/1/1.68.

Example III

The same procedure was followed as in Example I except that the mixture was stirred for ten minutes at 70° C. before being pressurized with propylene at 40 p.s.i.g. and maintained at 70° C. with stirring for 24 hours. The amount of polymer was increased to 25.1 grams.

Example IV

To the mixture of Example III comprising 6.5 millimoles of ethylaluminum dichloride and 3.2 millimoles of $(TiCl_3)_3 \cdot AlCl_3$ were added 5.1 millimoles of triisopropylbenzaldehyde after the mixture had been pressurized for one minute with 40 p.s.i.g. of propylene. The polymer produced weighed 22 grams and was 97.0% insoluble in boiling acetone and 91.4% insoluble in boiling heptane.

Example V 5.2 millimoles of triethylbenzaldehyde were added to 100 milliliters of a light hydrocarbon distillate (boiling range 248–291° F.). 0.46 gram of $(TiCl_3)_3 \cdot AlCl_3$ and 0.67 millimole of ethylaluminum dichloride were added. The mixture was pressurized with propylene to 40 p.s.i.g. and stirred at 70° C. for six hours. The polymer was recovered as in Example I. The product weighed 15 grams and was 95.6% insoluble in boiling heptane with a DTA melting point at 159° C.

Example VI 5.2 millimoles of pentamethylbenzaldehyde were added to 3.1 millimoles of $(TiCl_3)_3 \cdot AlCl_3$ and 6.5 millimoles of ethylaluminum dichloride in 100 milliliters of benzene, maintained at 70° C. for six hours under 40 p.s.i.g. of propylene. The polymer was recovered as in Example I and weighed 17.4 grams and was 91% insoluble in boiling heptane.

Example VII 5.1 millimoles of triisopropylbenzaldehyde were added to 100 milliliters of benzene and 3.1 millimoles of $(TiCl_3)_3 \cdot AlCl_3$, and 6.5 millimoles of ethylaluminum dichloride, and constantly stirred at 70° C. Ethylene was added at 40 p.s.i.g. for thirty minutes and then propylene for four hours and then ethylene for thirty minutes. The polymer was recovered as in Example I and weighed 9 grams. The product was 6.2% soluble in ether and 40.2% soluble in boiling heptane. Differential thermal analysis showed two first-order transitions, one at 125° C. and one at 148° C. The presence of two melting points and difference in solubility characteristics compared to the corresponding homopolymers indicate a block copolymer was formed.

Example VIII 5.4 millimoles of tetramethylbenzaldehyde were added to 100 milliliters of benzene containing 3.1 millimoles of $(TiCl_3)_3 \cdot AlCl_3$ and 6.5 millimoles of ethylaluminum dichloride. The mixture was pressurized with propylene at 40 p.s.i.g. and stirred for six hours at 70° C. The polymer was recovered as in Example I and weighed 18.6 grams.

Example IX 9.6 milliliters of a 0.537 molar solution of triethylbenzaldehyde solution in benzene were injected into 6.5 millimoles of ethylaluminum dichloride and 3.1 millimoles of $(TiCl_3)_3 \cdot AlCl_3$ and 100 milliliters of anhydrous benzene, and stirred for six hours at 70° C. under 40 p.s.i.g. of propylene. The polymer was recovered as in Example I and weighed 40.7 grams with a melting point of 159° C. It was 94.1% insoluble in boiling heptane.

Example X 5.02 millimoles of dimethylbenzaldehyde were added to 3.1 millimoles of $(TiCl_3)_3 \cdot AlCl_3$ and 6.5 millimoles of ethylaluminum dichloride in admixture in 100 milliliters of anhydrous benzene after the mixture had been pressurized for one minute with propylene at 40 p.s.i.g. The reaction was continued for five hours under 40 p.s.i.g. of propylene at 70° C. with continuous stirring. 1.5 grams of dried polymer were produced.

Example XI 4.7 millimoles of tolualdehyde were added to 3.2 millimoles of $(TiCl_3)_3 \cdot AlCl_3$, 6.5 millimoles of ethylaluminum dichloride and 100 milliliters of anhydrous benzene, stirred and pressurized with propylene at 40 p.s.i.g. and 70° C. for three hours. 0.8 gram of polymer were recovered.

Example XII

A mixture of 0.46 gram of $(TiCl_3)_3 \cdot AlCl_3$ and 0.825 gram of ethylaluminum dichloride in 100 milliliters of benzene was put under 40 p.s.i.g. of propylene for one minute, then vented to atmospheric pressure. Nine milliliters of a 0.537 molar solution of triethylbenzaldehyde in benzene were injected, and propylene was introduced to maintain a pressure of 40 p.s.i.g. At the end of thirty minutes, addition of propylene was discontinued, and ethylene was added at 40 p.s.i.g. for five minutes. Propylene was then added, followed by a five-minute addition of ethylene. Alternate addition of propylene for one hour and ethylene for five minutes was repeated once more. The reaction was quenched by adding 10 milliliters of methanol. The polymerization mixture was poured into 300 milliliters of isopropanol and filtered. The polymer was washed twice with methanol in a Waring Blendor and dried for sixteen hours at 60° C. under vacuum. The dried product weighed 10 grams. Differential thermal analysis showed a single broad exothermic peak in the vicinity of 140° C. There was no evidence of a first-order transition below this temperature, indicating there were no long sequences of polyethylene in the polymer molecule. Lowering of the polypropylene melting point to 140° C. indicated some copolymerization took place. This is also supported by solubility characteristics of the product. It was 21% soluble in diethyl ether and 56.1% soluble in boiling heptane. A homopolymer of propylene prepared under identical conditions using the same catalyst composition was 2% soluble in diethyl ether and 5.9% soluble in boiling heptane.

Example XIII

A mixture of 600 milligrams of $3TiCl_3 \cdot AlCl_3$ and 0.67 millimole of ethylaluminum dichloride in 100 milliliters of anhydrous benzene was put under 40 p.s.i.g. of propylene for one minute. The reaction vessel was vented to atmospheric pressure, 8.5 milliliters of a 0.38 M solution of bimesitylaldehyde in benzene were injected, and propylene again introduced. The polymerization mixture was maintained at 70° C. under 40 p.s.i.g. of propylene for six hours with stirring. At the end of this time, the mixture was poured into 300 milliliters of isopropanol, and polymer was recovered by filtration. The polymer was washed with hot acetone, hexane, benzene, heptane, and finally methanol. Washings were carried out by stirring the polymer in each of the above solvents while heating to boiling, then filtering rapidly. The extracted polymer was dried overnight in a vacuum oven at 60° C. The white powdery polymer weighed 3.6 grams and had a melting point (DTA) of 156° C.

It can be seen from the foregoing examples that highly crystalline polymers of propylene may be produced which contain very small amounts of oil or rubber polymers. For many uses it is unnecessary to extract the polymeric product.

It will be apparent that many changes and modifications of the several features described herein may be made without departing from the spirit and scope of the invention. It is, therefore, apparent that the foregoing description is by way of illustration of the invention rather than limitation of the invention.

We claim:

1. As a composition of matter, a catalytic mixture comprising (a) aluminum dihalide having a formula $R_1AlX_2$ wherein $R_1$ is a hydrocarbon radical containing 1 to 12 carbon atoms and selected from the group consisting of alkyl, aryl and aralkyl, and X is a halogen atom selected from the group consisting of chlorine, bromine, and iodine, (b) compound of titanium selected from the group consisting of $TiCl_3$ and $(TiCl_3)_3 \cdot AlCl_3$, and (c) substituted aromatic aldehyde of the formula:

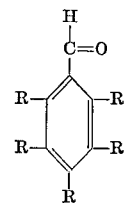

where at least one "R" is an alkyl group and each of the remaining "R's" is selected from hydrogen, an alkyl group and an aryl group.

2. The composition of claim 1 wherein said substituted aromatic aldehyde is mesitaldehyde.
3. The composition of claim 1 wherein said substituted aromatic aldehyde is dimethylbenzaldehyde.
4. The composition of claim 1 in which the substituted aromatic aldehyde is triethylbenzaldehyde.
5. The composition of claim 1 in which the substituted aromatic aldehyde is triisopropylbenzaldehyde.
6. The composition of claim 1 in which the substituted aromatic aldehyde is pentamethylbenzaldehyde.
7. The composition of claim 1 in which the substituted aromatic aldehyde is tetramethylbenzaldehyde.
8. The composition of claim 1 where said aluminum dihalide is ethylaluminum dihalide.
9. The composition of claim 1 where said compound of titanium is titanium trichloride.
10. The composition of claim 1 where said compound of titanium is aluminum-reduced titanium chloride of the formula $(TiCl_3)_3 \cdot AlCl_3$.
11. The composition of claim 1 wherein at least one R is an alkyl group selected from the group consisting of methyl, ethyl, propyl and isopropyl.
12. The composition of claim 1 in which the substituted aromatic aldehyde is bimesitylaldehyde.
13. In the polymerization of an alpha-olefin to form solid crystalline polymers, the improvement which comprises catalyzing the polymerization of said hydrocarbon with a catalytic mixture containing (a) aluminum dihalide having the formula $R_1AlX_2$ wherein $R_1$ is a hydrocarbon radical containing 1 to 12 carbon atoms selected from the group consisting of alkyl, aryl, and aralkyl, and X is a halogen atom selected from the group consisting of chlorine, bromine, and iodine, (b) salt of titanium selected from the group consisting of $TiCl_3$ and $(TiCl_3)_3 \cdot AlCl_3$, and (c) substituted aromatic aldehyde having the formula:

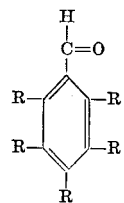

where at least one "R" is an alkyl group and each of the remaining "R's" is selected from hydrogen, an alkyl group and an aryl group.

14. The process of claim 13 wherein at least one R is an alkyl group selected from the group consisting of methyl, ethyl, propyl and isopropyl.

15. The process of claim 13 wherein the alpha olefin is propylene.

16. The process of claim 13 wherein the alpha olefin is ethylene.

17. The process of claim 13 where the aluminum dihalide is ethylaluminum dichloride.

18. The process of claim 13 wherein the transition metal halide is titanium trichloride.

19. The process of claim 13 wherein the transition metal halide is an aluminum-reduced titanium trichloride of the formula $(TiCl_3)_3 \cdot AlCl_3$.

20. The process of claim 13 wherein said substituted aromatic aldehyde is mesitaldehyde.

21. The process of claim 13 wherein said substituted aromatic aldehyde is triisopropylbenzaldehyde.

22. The process of claim 13 wherein said substituted aromatic aldehyde is triethylbenzaldehyde.

23. The process of claim 13 wherein said substituted aromatic aldehyde is pentamethylbenzaldehyde.

24. The process of claim 13 wherein said substituted aromatic aldehyde is tetramethylbenzaldehyde.

25. The process of claim 13 wherein said substituted aromatic aldehyde is dimethylbenzaldehyde.

26. The process of claim 13 wherein said substituted aromatic aldehyde is bimesitylaldehyde.

References Cited

UNITED STATES PATENTS

| 2,881,156 | 4/1959 | Pilar et al. | 260—94.9 |
| 3,163,611 | 12/1964 | Andersen et al. | 252—429 |
| 3,210,332 | 10/1965 | Lyons et al. | 260—93.7 |

JOSEPH L. SCHOFER, Primary Examiner

EDWARD J. SMITH, Assistant Examiner

U.S. Cl. X.R.

252—429; 260—88.2, 93.7, 878